(12) United States Patent
Kojima et al.

(10) Patent No.: US 8,061,330 B2
(45) Date of Patent: Nov. 22, 2011

(54) FUEL SUPPLYING APPARATUS FOR GAS ENGINE

(75) Inventors: Hiroaki Kojima, Wako (JP); Masanori Fujinuma, Wako (JP); Toru Taniguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 340 days.

(21) Appl. No.: 12/479,892

(22) Filed: Jun. 8, 2009

(65) Prior Publication Data

US 2009/0308352 A1 Dec. 17, 2009

(30) Foreign Application Priority Data

Jun. 11, 2008 (JP) ................... 2008-153265

(51) Int. Cl.
*F02M 69/54* (2006.01)
(52) U.S. Cl. ..................................... 123/457
(58) Field of Classification Search .......... 123/457, 123/464, 465, 527, 543, 546, 557, 590; 261/152, 261/157

See application file for complete search history.

(56) References Cited

U.S. PATENT DOCUMENTS 5,251,602 A * 10/1993 Kurihara et al. ............. 123/527
5,755,203 A * 5/1998 Mastumoto .................. 123/403

FOREIGN PATENT DOCUMENTS

| JP | 64-19052 U | 1/1989 |
| JP | 64-21252 U | 2/1989 |
| JP | 2002-021642 A | 1/2002 |
| JP | 2006-348916 A | 12/2006 |
| JP | 2007-092611 A | 4/2007 |

OTHER PUBLICATIONS

Chinese Office Action dated Mar. 9, 2011, issued in corresponding Chinese Patent Application No. 200910148842.0.
Korean Office Action dated Mar. 17, 2011, issued in corresponding Korean Patent Application No. 10-2009-0049905.

* cited by examiner

*Primary Examiner* — Mahmoud Gimie
(74) *Attorney, Agent, or Firm* — Westerman, Hattori, Daniels & Adrian, LLP

(57) ABSTRACT

A fuel supplying apparatus is configured to supply a gas engine with gas fuel in such a manner that tar separated from the gas fuel is guided to the engine. The apparatus includes a primary regulator and a secondary regulator formed integrally with the primary regulator. The primary regulator communicates with the secondary regulator through a gas passage. The secondary regulator is disposed below the primary regulator. The secondary regulator has a gas inlet for taking in the gas fuel and the tar that have passed from the primary regulator through the gas passage. The secondary regulator has an orifice disposed below the gas inlet for discharging the gas fuel and the tar. The tar separated from the gas fuel flows from the primary regulator through the gas passage and the gas inlet into the secondary regulator and discharged out of the orifice into the engine.

3 Claims, 5 Drawing Sheets

FUEL SUPPLYING APPARATUS FOR GAS ENGINE

FIELD OF THE INVENTION

The present invention relates to an improved apparatus for supplying a gas engine with a gas fuel in such a manner that tar separated from the gas fuel is efficiently guided to the engine.

BACKGROUND OF THE INVENTION

Fuel supplying apparatuses vaporize liquefied fuel into gas fuel and supply such gas fuel to gas engines. These apparatuses have problems that tar produced after the vaporization of the liquefied fuel remains within the apparatuses. The remaining tar can deteriorate rubber components such as diaphragms, clog up jet ports of the apparatuses, or hinder flow control valve from closely contacting valve seats.

JP-U-64-19052 and JP-U-64-21252 disclose fuel supplying apparatuses for gas engines, which are designed to address those problems. The disclosed apparatuses include heaters for heating fuel passageways which interconnect vaporizers and mixers.

The apparatus disclosed in JP-U-64-19052 includes a main fuel passageway which interconnects a secondary chamber of a vaporizer and a venturi of a mixer, and a low-speed fuel passageway which interconnects a primary chamber of the vaporizer and a portion of the mixer disposed below the venturi. Attached to these passageways are first and second heaters that are made of nichrome wires.

The apparatus disclosed in JP-U-64-21252 includes a heater attached to both a main fuel passageway and a low-speed fuel passageway and configured to guide engine-cooling water through the heater.

Some small-sized general-purpose engine does not carry a battery or a generator, for decreased cost and weight, etc of the engine. It is difficult for such small-sized general purpose engines to carry the electric heaters as disclosed in JP-U-64-19052 or the heater utilizing the engine-cooling water as disclosed in JP-U-64-21252 because these general-purpose engines are air-cooled engines.

Other than the above heaters, heating means may include ones that use engine-cooling air or exhaust heat from mufflers, but such heating means have temperatures that are difficult to control. For the small-sized general-purpose engines, therefore, there is a need for a simple structure designed to efficiently discharge tar out of fuel passageways without utilizing the heaters.

SUMMARY OF THE INVENTION

An object of the present invention is to provide a fuel supplying apparatus having a simple structure designed to efficiently discharge tar to an engine.

According to one aspect of the present invention, there is provided a fuel supplying apparatus for a gas engine, comprising: a primary regulator having a pressure-reducing chamber for reducing a pressure of gas fuel to a predetermined pressure, the gas fuel being produced by vaporization of liquefied fuel; a secondary regulator provided integrally with the primary regulator for reducing the reduced pressure of the gas fuel to a pressure close to atmospheric pressure; and the secondary regulator being located below the primary regulator and having a gas inlet communicating with the pressure-reducing chamber of the primary regulator and a gas outlet located below the gas inlet, such that tar separated from the gas fuel flows from the primary regulator to the gas outlet of the secondary regulator.

The tar having flowed into the primary regulator along with the gas fuel passes into the secondary regulator disposed below the primary regulator. More specifically, the tar flows from the gas inlet through the secondary regulator to the gas outlet disposed below the gas inlet.

The weight of the tar and the flow of the gas fuel help the tar flow smoothly downwardly from the primary regulator through the gas inlet and out of the gas outlet into the gas engine without the tar remaining within the primary and secondary regulators. Thus, it is not necessary to provide the fuel passages of the regulators with electric devices or heaters utilizing engine-cooling water for heating the fuel passages so as to remove the tar. The simple structure of the regulators which does not require such heaters and electric devices enables the tar to be efficiently discharged from the fuel passages, such that components or members in the fuel passages are not affected by the tar.

In a preferred form of the present invention, the secondary regulator has a groove portion extending between the gas inlet and the gas outlet, and a lid covering the groove portion, the lid and the groove portion defining a tunnel-shaped passage for allowing the gas fuel and the tar to flow through the tunnel-shaped passage. The tar having flowed through the gas inlet into the secondary regulator smoothly passes through the tunnel-shaped passage to the gas outlet located below the gas inlet. This is why the tar can be reliably discharged out of the secondary regulator, which eliminates the need for regular maintenance operation.

In a further preferred form of the present invention, the fuel supplying apparatus further comprises a mixer disposed below the secondary regulator for mixing the gas fuel and air together.

In a further preferred form of the present invention, the mixer has an air passageway formed therein, and the gas outlet of the secondary regulator communicates with the air passageway.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
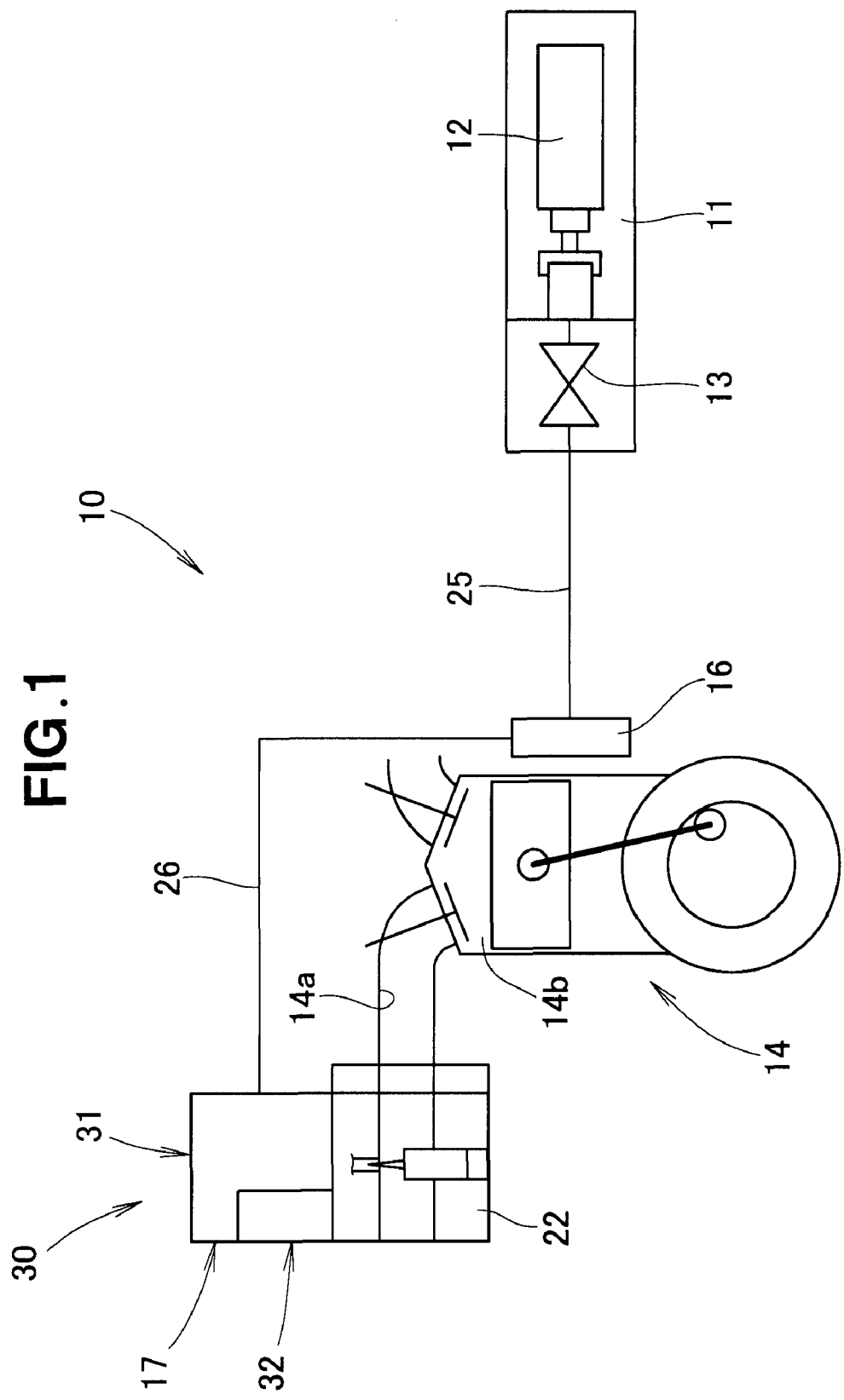
FIG. 1 is a view showing a system including a gas engine and a fuel supplying apparatus for the engine according to one embodiment of the present invention.

A fuel supplying apparatus 10 shown in FIG. 1 includes a small-sized cylinder 12 filled with liquefied fuel, e.g., liquefied butane, a manual cock 13 for allowing and blocking flow of the fuel from the cylinder 12, a vaporizer 16 for vaporizing the liquefied fuel into gas fuel (butane gas) through the use of heat generated by a gas engine 14, and a regulator assembly 17 for reducing a pressure of the gas fuel. The cylinder 12 is attached to a cylinder case 11. The manual cock 13 is formed integrally with the cylinder case 11.

The gas fuel reduced in pressure by the regulator assembly 17 is supplied to a mixer 22 where the gas fuel is mixed with air into a fuel-air mixture. The mixer 22 is formed integrally with the regulator assembly 17. The mixture is taken into a combustion chamber 14b of the engine 14 through an intake port 14a of the engine 14. Reference numerals 25, 26 denote fuel pipes. The regulator assembly 17 and the mixer 22 constitute a regulator/mixer 30.

Figure 2:
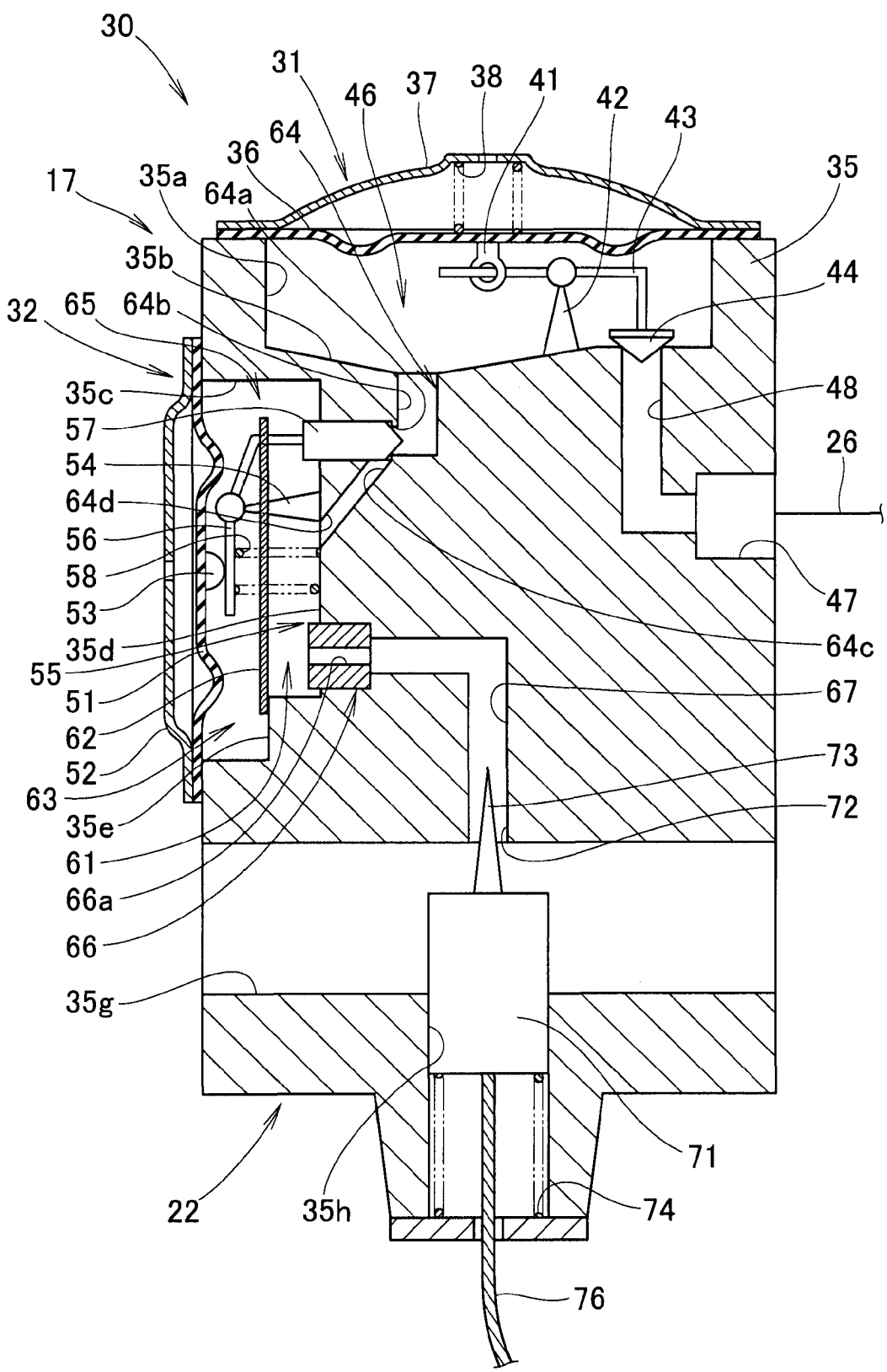
FIG. 2 is a cross-sectional view of the apparatus comprising a regulator/mixer including primary and secondary regulators and a mixer.

As shown in FIG. 2, the regulator assembly 17 includes a primary regulator 31 disposed at an upper part thereof for reducing a pressure of gas fuel to a predetermined pressure. The assembly 17 also includes a secondary regulator 32 disposed at a lateral side thereof for further reducing the predetermined pressure of the gas fuel (the pressure of the gas fuel reduced by the primary regulator 31) to a pressure close to atmospheric pressure. The mixer 22 is disposed under the regulator assembly 17.

The primary regulator 31 includes a first diaphragm 36 covering a top recess 35a formed at a top of a body 35, and a cap member 37 covering a top side of the first diaphragm 36. The first diaphragm 36 is fixedly sandwiched between the cap member 37 and a top surface of the body 35. The primary regulator 31 includes a first spring 38 disposed between the cap member 37 and a support plate (now shown) provided on a top surface of the first diaphragm 36 such that the first spring 38 urges the first diaphragm 36 downwardly. The primary regulator 31 includes a rod member 41 projecting downwardly from the support plate and the first diaphragm 36, a fulcrum 42 mounted on a tapered bottom surface 35b of the top recess 35a, and a first regulator lever 43 swingably mounted on the fulcrum 42. The first regulator lever 43 has one end connected to the rod member 41, and an opposite end bent downwardly. The primary regulator 31 further includes a pressure control valve 44 disposed at the downwardly bent opposite end of the first regulator lever 43.

The first regulator 31 has a pressure-reducing chamber 46 defined by the top recess 35a and the first diaphragm 36. The body 35 has a gas inlet 47 connected via the fuel pipe 26 to the vaporizer 16 (FIG. 1). The gas inlet 47 communicates with the top recess 35a through a gas passageway 48.

The secondary regulator 32 includes a second diaphragm 51 covering a lateral recess 35c formed at a lateral side of the body 35, and a cap member 52 covering an outer lateral side of the second diaphragm 51. The second diaphragm 51 is fixedly sandwiched between the cap member 52 and a lateral surface of the body 35. The secondary regulator 32 includes a projecting portion 53 projecting inwardly from an inner lateral surface of the second diaphragm 51, a fulcrum 54 attached to a bottom 35d of a groove portion 55 defined in the lateral recess 35c, and a second regulator lever 56 swingably mounted on the fulcrum 54. The second regulator lever 56 has one end abutting against the projecting portion 53, and a bent opposite end. The secondary regulator 32 includes a pressure control valve 57 mounted to the bent opposite end of the second regulator lever 56, and a spring 58 disposed between the one end of the second regulator lever 56 and the bottom 35d of the groove portion 55. The secondary regulator 32 further includes a lid member 62 attached to a bottom surface 35e of the lateral recess 35c. The lid member 62 covers the groove portion 55 of the lateral recess 35c. The lid member 62 and the groove portion 55 define a tunnel-shaped passage 61.

The secondary regulator 32 is located below the primary regulator 31. The top recess 35a communicates with the lateral recess 35c through a gas passage 64. At a middle of the gas passage 64 is provided a valve seat portion 64a. The gas passage 64 is closed by the pressure control valve 57 urged against the valve seat portion 64a by a resilience force of the spring 58.

The gas passage 64 includes an upstream passage portion 64b vertically downwardly extending from the top recess 35a to the valve seat portion 64a, and a downstream passage portion 64c obliquely downwardly extending from the valve seat portion 64a to the lateral recess 35c. The downstream passage portion 64c has a gas inlet 64d formed at one end thereof. The gas inlet 64d is an entrance of the tunnel-shaped passage 61.

From the secondary regulator 32 and the mixer 22 extends a gas passage 67 having one end at which an orifice member 66 is disposed. The orifice member 66 has an orifice 66a formed therethrough. The orifice 66 defines a gas outlet of the secondary regulator 32. The orifice 66a of the orifice member 66 is located below the gas inlet 64d.

The gas inlet 64d and the orifice member 66 are disposed at the bottom 35d of the groove portion 55. The lid member 62 divides a space within the secondary regulator 32 into the tunnel-shaped passage 61, a diaphragm-side chamber 63, and a communicating chamber 65 communicating with both the passage 61 and the chamber 63. The communicating chamber 65 is defined above the lid member 62.

The mixer 22 has an air passageway 35g formed through the body 35. The mixer 22 includes a venturi piston 71 inserted into a vertical hole 35h formed in the body 35. The venturi piston 71 is vertically movable to change a cross-sectional area of the air passageway 35g in response to change in amount of air flowing through the air passageway 35g. The mixer 22 further includes a needle 73 mounted on a top end of the piston 71 and inserted into a nozzle portion 72 of the gas passage 67. The nozzle portion 72 defines an opening of the air passageway 35g. The mixer 22 includes a spring 74 urging the venturi piston 71 upwardly. The air passageway 35g has its downstream side connected to the intake port 14a (FIG. 1) of the gas engine 14.

The venturi piston 71 has a lower end to which is attached one end of a wire 76. The wire 76 has an opposite end connected to a throttle lever provided to the gas engine. When the throttle lever is handled, the piston 71 is vertically moved by the wire 76, thereby change the cross-sectional area of the air passageway 35g. The needle 73 is also moved vertically together with the piston 71, thereby changing a cross-sectional area of the opening defined by the nozzle portion 72. The changes in the cross-sectional areas of the air passageway 35g and the opening defined by the nozzle portion 72 adjust amount of air passing through the air passageway 35g and amount of fuel passing through the nozzle portion 72.

Figure 3A:
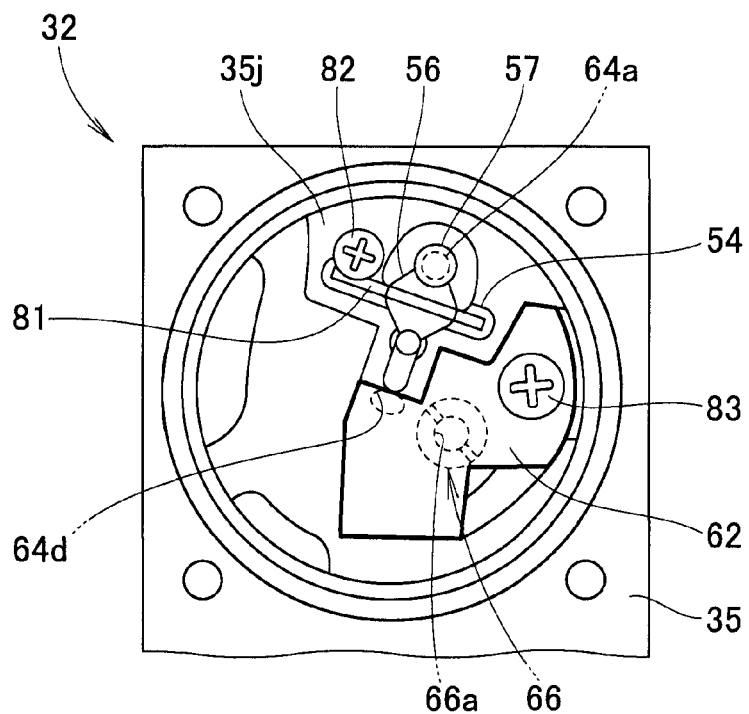
FIG. 3A and FIG. 3B are side elevation views of the secondary regulator shown in FIG. 2.
Figure 3B:
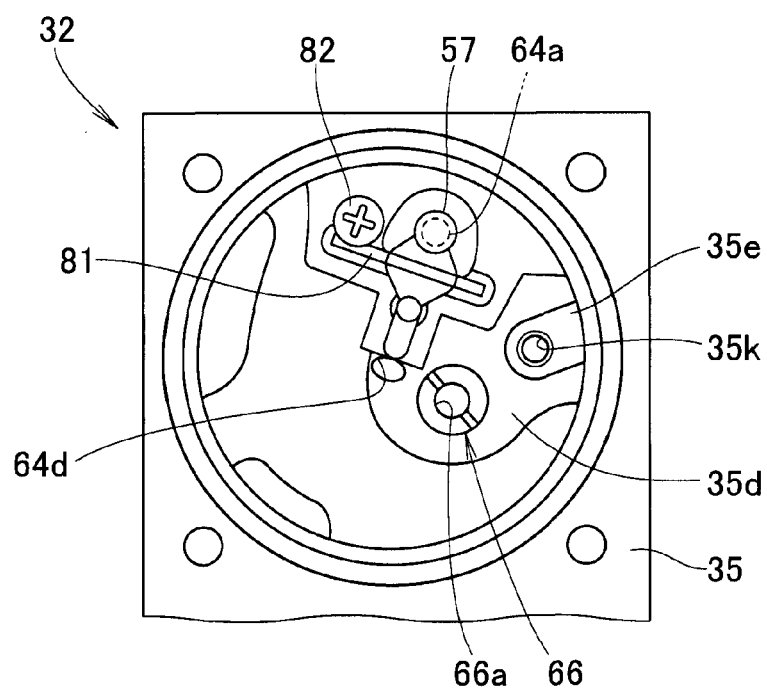

FIGS. 3A and 3B illustrate the secondary regulator 32 shown in FIG. 2. As shown in FIG. 3A, a support shaft 81 is provided integrally with the second regulator lever 56 and supported by the fulcrum 54. A screw 82 attaches the shaft 81 to a wall portion 35j disposed in the vicinity of the fulcrum 54. The lid member 62 shown by a bold line is attached to the bottom surface 35e (FIG. 2) of the lateral recess 35c by a screw 83.

FIG. 3B shows the secondary regulator 32 illustrated in FIG. 3B with the lid member 62 removed. The orifice 66a defining the gas outlet is located below the gas inlet 64d formed in the bottom 35d of the groove portion 55. The screw 83 (FIG. 3A) is screwed into an internal thread 35k formed in the bottom surface 35e of the lateral recess 35c.

Figure 4:
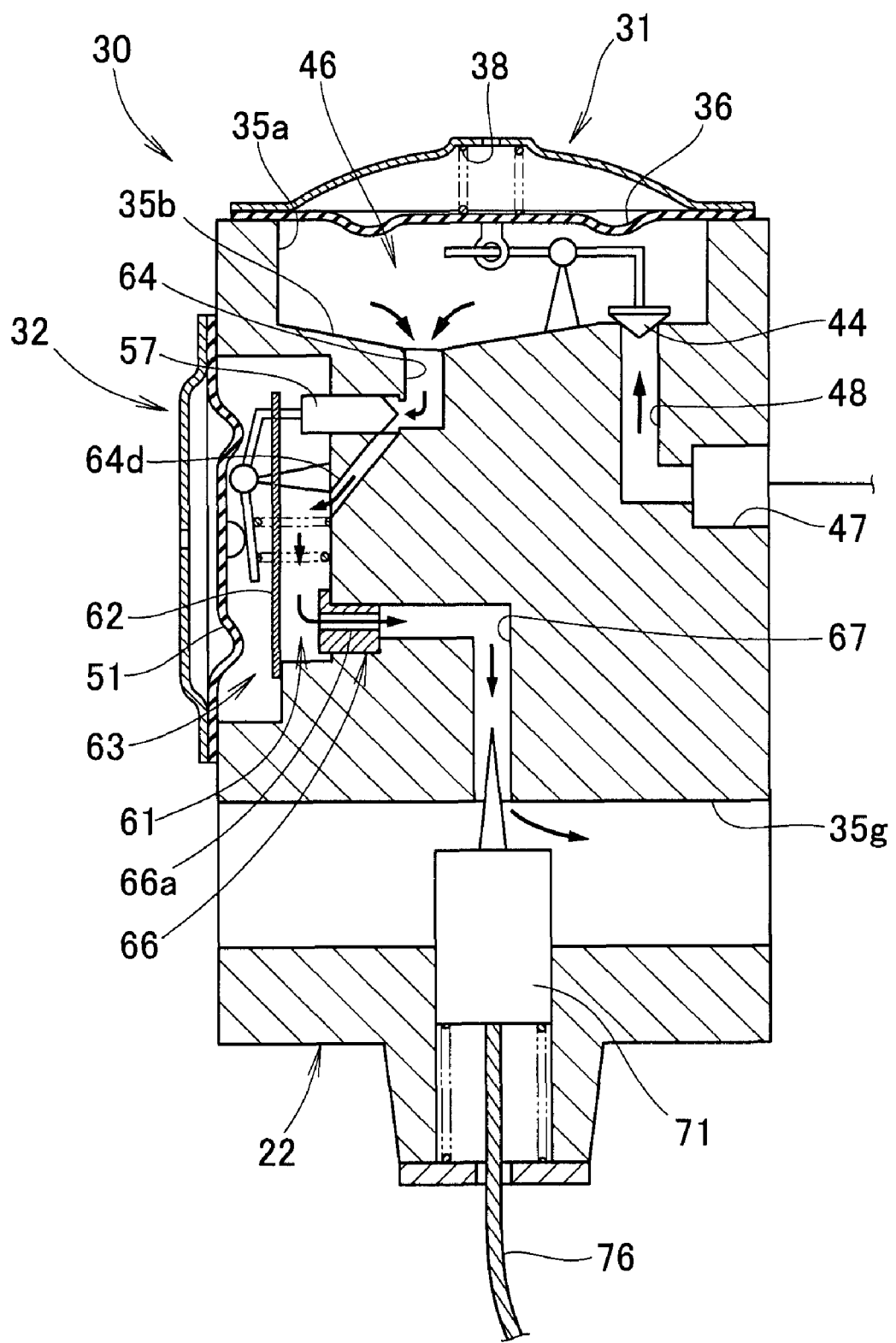
FIG. 4 is a view showing flow of gas fuel and tar through the regulator/mixer shown in FIG. 2.

Discussion will be made as to operation of the regulator/mixer 30 of the fuel supplying apparatus 10 with reference to FIG. 4. As shown by arrows of FIG. 4, gas fuel produced by vaporization of liquefied fuel, and tar produced as residue after the gas fuel is produced flow from the gas inlet 47 through the gas passageway 48 into the pressure-reducing chamber 46. When the pressure control valve 57 is opened by pressure within the tunnel-shaped passage 61 and the diaphragm-side chamber 63, the gas fuel passes through the gas passage 64 into the tunnel-shaped passage 61 of the secondary regulator 32, as indicated by the arrows. The tar in liquid state flows along the tapered bottom surface 35b of the top recess 35a of the pressure-reducing chamber 46 through the gas passage 64 into the tunnel-shaped passage 61.

In the secondary regulator 32, the gas fuel flows from the gas inlet 64d through the tunnel-shaped passage 61 into the orifice 66a while the tar falls from the gas inlet 64d and then sucked into the orifice 66a together with the gas fuel, as shown by the arrows. The gas fuel and the tar flows through the gas passage 67 into the air passageway 35g of the mixer 22. The gas fuel and the tar mix with air within the air passageway 35g, and the resultant mixture flows into the combustion chamber 14b of the gas engine 14 for combustion.

The tapered configuration of the bottom surface 35b of the pressure-reducing chamber 46 of the primary regulator 31 enables tar within the chamber 46 to smoothly flow under its own weight into the gas passage 64. Since the secondary regulator 32 is located below the primary regulator 32, the tar can readily flow down into the regulator 32 through the gas passage 64. Since the orifice 66a defining the gas outlet is disposed below the gas inlet 64d, the tar having passed out of the gas inlet 64d can easily fall into the orifice 66a under its own weight.

The tunnel-shaped passage 61 is configured to rectify the flow of the fuel gas to provide smooth flow of the fuel gas. The smooth flow of the gas fuel helps the tar fall smoothly through the tunnel-shaped passage 61 with less tar clung to an inner wall of the tunnel-shaped passage 61. Since the tar passes through the tunnel-shaped passage 61 without remaining within the passage 61, it becomes possible to prevent the tar from clinging to movable sections or components such as the second diaphragm 51 disposed outside the tunnel-shaped passage 61 (i.e., within the diaphragm-side chamber 63) of the secondary regulator 32.

Since the mixer 22 is located below the secondary regulator 32, the tar can easily flow into the air passageway 35g of the mixer 22 through the gas passage 67.

As described above, the secondary regulator 32 is disposed below the primary regulator 31. The orifice 66a defining the gas outlet of the secondary regulator 32 is disposed below the gas inlet 64d of the secondary regulator 32. With the primary and secondary regulators 31, 32 thus arranged, the tar separated from the gas fuel flows downwardly from the primary regulator 31 through the secondary regulator 32. More specifically, the tar and the gas fuel smoothly flow from the primary regulator 31 through the gas inlet 64d of the secondary regulator 32 into the secondary regulator 32 and out of the gas outlet (the orifice 66a) without the tar remaining within the regulators 31, 32. Thus, it is not necessary to provide the fuel passages of the regulators 31, 32 with electric devices or heaters utilizing engine-cooling water for heating the fuel passages so as to remove the tar. The simple structure of the regulators 31, 32 which does not require such heaters and electric devices enables the tar to be efficiently discharged from the fuel passages into the gas engine 14, such that components or members in the fuel passages are not affected by the tar.

Figure 5:
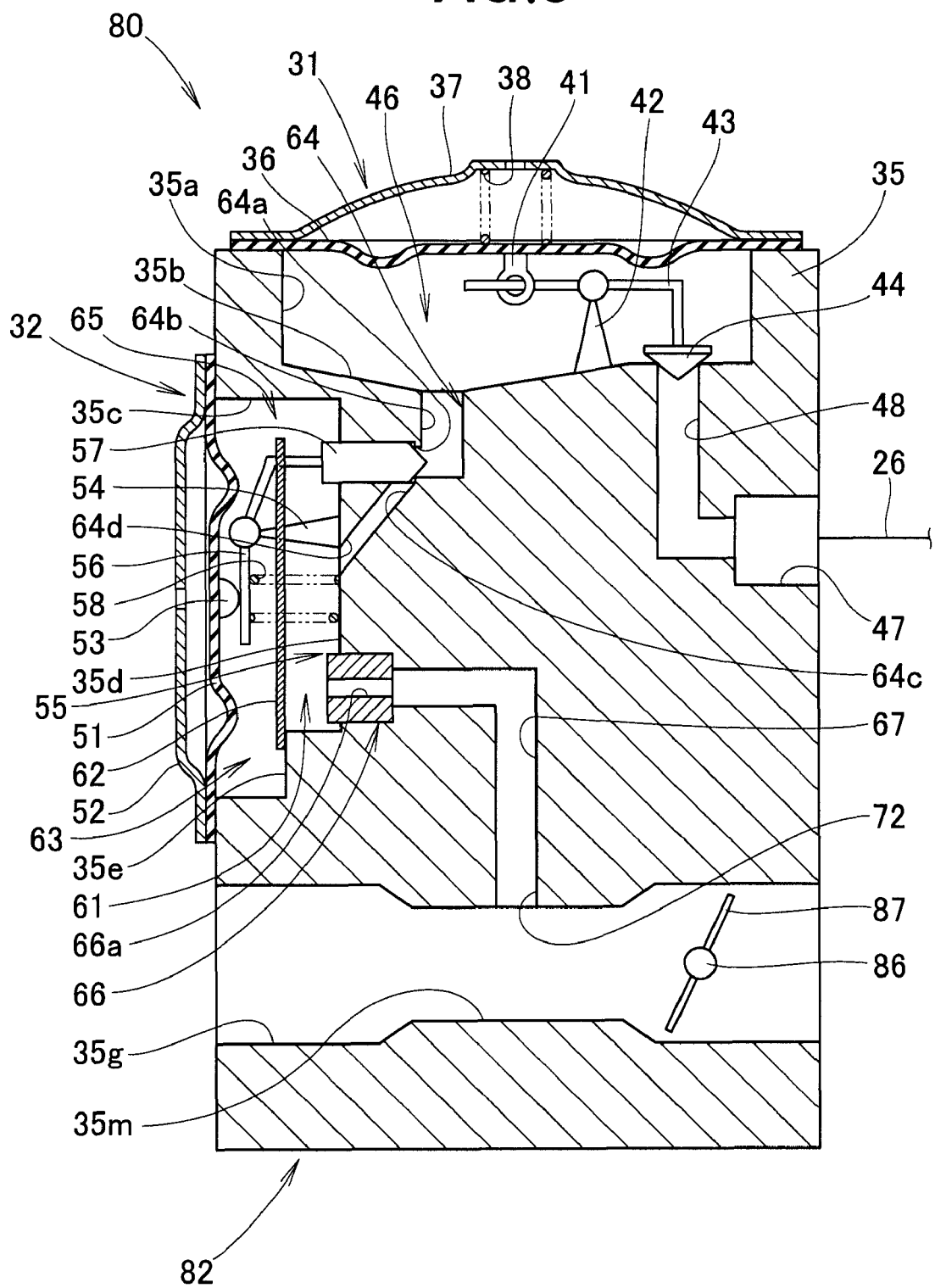
FIG. 5 is a cross-sectional view of a regulator/mixer according to a second embodiment of the present invention.

FIG. 5 shows a regulator/mixer 80 according to a second embodiment of the present invention. The regulator/mixer 80 includes the primary regulator 31 disposed at an upper part thereof for reducing a pressure of gas fuel to a predetermined one, and the secondary regulator 32 disposed at a lateral side thereof for reducing the reduced pressure of the gas fuel to a pressure close to atmospheric pressure. The regulator/mixer 80 further includes a mixer 82 disposed at a lower part thereof.

The mixer 82 includes the air passageway 35g formed through the body 35, and a throttle valve 87 mounted on a throttle shaft 86 for opening and closing the air passageway 35g. The throttle shaft 86 is rotatably provided in the body 35. Located downstream of the throttle valve 87 is a downstream portion of the air passageway 35g that is connected to the intake port 14a (FIG. 1) of the gas engine 14. The air passageway 35g has a venturi portion 35m of small cross-sectional area for providing reduced flow of air. The venturi portion 35m is disposed at a portion of the air passageway 35g facing towards the opening defined by the nozzle portion 72.

In another embodiment of the present invention, the primary and secondary regulators 31, 32 may be provided separately from the mixer 22 in such a manner that the mixer 22 is disposed below the secondary regulator 32.

Obviously, various minor changes and modifications of the present invention are possible in the light of the above teaching. It is therefore to be understood that within the scope of the appended claims the invention may be practiced otherwise than as specifically described.

What is claimed is:

1. A fuel supplying apparatus for a gas engine, comprising:
   a primary regulator having a pressure-reducing chamber for reducing a pressure of gas fuel to a predetermined pressure, the gas fuel being produced by vaporization of liquefied fuel; and
   a secondary regulator provided integrally with the primary regulator for reducing the reduced pressure of the gas fuel to a pressure close to atmospheric pressure;
   wherein the secondary regulator is located below the primary regulator and has a gas inlet communicating with the pressure-reducing chamber of the primary regulator and a gas outlet located below the gas inlet, such that tar separated from the gas fuel flows from the primary regulator to the gas outlet of the secondary regulator, and
   wherein the secondary regulator has a groove portion extending between the gas inlet and the gas outlet, and a lid covering the groove portion, the lid and the groove portion defining a tunnel-shaped passage for allowing the gas fuel and the tar to flow through the tunnel-shaped passage.

2. The fuel supplying apparatus of claim 1, further comprising a mixer disposed below the secondary regulator for mixing the gas fuel and air together.

3. The fuel supplying apparatus of claim 2, wherein the mixer has an air passageway formed therein, and the air passageway of the mixer communicates with the gas outlet of the secondary regulator.

* * * * *